United States Patent [19]

Staub

[11] Patent Number: 5,280,400
[45] Date of Patent: Jan. 18, 1994

[54] MICROCASSETTE TO STANDARD CASSETTE ADAPTER

[76] Inventor: Craig W. Staub, 2875 Sedgwick Ave., Bronx, N.Y. 10468

[21] Appl. No.: 763,545

[22] Filed: Sep. 23, 1991

[51] Int. Cl.⁵ .............................................. G11B 23/04
[52] U.S. Cl. ...................................... 360/94; 360/96.2
[58] Field of Search ..................... 360/94, 132, 96.2; 242/199, 198

[56] References Cited

U.S. PATENT DOCUMENTS

| | | | |
|---|---|---|---|
| 3,800,321 | 3/1974 | Bolick, Jr. | 360/94 |
| 3,964,099 | 6/1976 | Sato | 360/94 |
| 4,536,810 | 8/1985 | Umeda | 360/94 |
| 4,595,962 | 6/1986 | d'Alayer de Costemored'Arc | 360/85 |
| 4,688,121 | 8/1987 | Castagna | 360/94 |
| 5,146,376 | 9/1992 | Imanaga et al. | 360/94 |

Primary Examiner—Paul M. Dzierzynski
Assistant Examiner—Don Wong
Attorney, Agent, or Firm—Damon J. Borrelli

[57] ABSTRACT

Disclosed is an adapter apparatus useful in conjunction with recording systems employing tape cassettes. The apparatus includes a first and second element for operatively engaging the tape drive element of a tape recorder/playback apparatus, a compartment sized to receive a smaller tape cassette, a magnetic head, and an element connecting the magnetic head of the adapter apparatus to the magnetic head of the tape recorder/playback apparatus. The adapter is configured such that when a smaller cassette is positioned within the compartment the entire apparatus can be substantially flush-mounted in a tape recorder/playback apparatus, that is, the overall profile of the adapter remains unchanged whether or not a smaller cassette is positioned in it.

18 Claims, 2 Drawing Sheets

MICROCASSETTE TO STANDARD CASSETTE ADAPTER

BACKGROUND OF THE INVENTION

1. Field of the Invention

The present invention relates to recording systems. More particularly, the invention is directed to an adapter apparatus useful in conjunction with recording systems employing tape cassettes.

2. Description of the Prior Art

Modern tape recording and playback systems often utilize a magnetic media, i.e., a tape, contained within the body of a cassette. The cassette functions to protect the tape during use and storage. Further, the relatively small size and light weight of these cassettes, as compared to larger reel-to-reel tapes, makes them easy to handle and allows for the construction of relatively compact recording and playback systems.

Cassette tapes are produced in a variety of sizes and configurations. In these cassettes the majority of the tape is wound onto a pair of take-up wheels. As the tape proceeds from one take-up wheel to the other during use it is guided along a path which places it in contact with the components of a tape recorder/player. The desired tape speed for audio reproduction is provided by capstan assemblies of the tape recorder/playback apparatus which are connectable to, and disconnectable from, the take-up wheels. Standard tape cassettes are typically several inches on a side and are utilized in a variety of applications, for example, the in-home enjoyment of music. Microcassettes, on the other hand, are much smaller in size and are often used in combination with hand-held recording/playback apparatuses used for dictation.

Microcassettes suffer from the limitation that neither the cassette nor the tape recorder/playback apparatus designed for its use are compatible with the more widely available recorder/playback apparatus used with standard cassettes. Accordingly, the user of a microcassette recorder/playback apparatus, who may be using the apparatus while away from his office, must provide a special microcassette playback, or transcription, apparatus in his or her office. Thus, the user of the microcassette apparatus must maintain separate, non-compatible recording and playback systems for each size of cassette he or she may choose to use.

A need has arisen for an adapter which permits the use of a microcassette in a recorder/playback apparatus designed to accept cassettes having a larger overall configuration.

SUMMARY OF THE INVENTION

It is an object of the present invention to provide an adapter apparatus that alleviates the foregoing disadvantages and limitations.

It is a further object of the invention to provide an apparatus that is economical to manufacture and that provides a method for using a microcassette in a recorder/playback apparatus designed to accept cassettes having a larger overall configuration.

The invention is typically utilized in conjunction with a tape recording and playback apparatus having, as basic components, a tape drive element and a magnetic head.

The adapter apparatus of the present invention is sized such that it can be substantially flush-mounted within a cassette-receiving receptacle of a tape recording and playback apparatus. Further, during operation when a smaller cassette is positioned within the adapter apparatus no change in the profile of the adapter occurs, i.e., no portion of the smaller cassette extends beyond a surface of the adapter. The invention is characterized by a first and second element for operatively engaging the tape drive element of the tape recorder/playback apparatus, a compartment sized to receive a smaller tape cassette, a magnetic head, and an element connecting the magnetic head of the adapter apparatus to the magnetic head of the tape recorder/playback apparatus.

The adapter also preferably includes a first and a second substantially circular aperture. These apertures are positioned to receive the tape drive element of the tape recorder/playback apparatus.

In one embodiment of the invention, a rotatable hub is positioned adjacent to the first and second apertures. Each of the rotatable hubs have a multiplicity of projections extending from their outer surface into the first and second apertures. These projections serve to engage the tape drive element of the tape recorder/playback apparatus. More particularly, the projections engage the tape drive elements of the tape recorder/playback apparatus such that as they rotate the hubs are also rotated and, as a result, a driving force is communicated to the adapter apparatus. A drive belt operatively connects each hub to capstans located in the compartment of the apparatus.

In another embodiment of the invention, a cylindrical hub is concentrically positioned within each of the first and second apertures. The cylindrical hubs of this embodiment can have either a multiplicity of projections which extend from an inner surface and into the apertures, or an inner diameter sized to permit the hub to snugly engage the drive elements of the tape recorder/playback apparatus. A drive belt also operatively connects the cylindrical hubs of this embodiment to the capstans located within the compartment.

The compartment which receives the smaller tape cassette typically includes a first and a second capstan element. As discussed above, the capstan elements within the compartment are operatively engaged to those elements engaging the tape drive elements of the tape recorder/playback apparatus. The compartment also houses the magnetic head of the adapter apparatus. The magnetic head is moveable between an extended position and a recessed position relative to the compartment. When in the extended position a significant portion of the magnetic head extends into the compartment. Only a small portion of the magnetic head extends into the compartment when the head is in its recessed position. The compartment is preferably positioned between the circular apertures of the adapter apparatus such that its major axis is perpendicular to a major axis of the adapter apparatus.

Other general and specific objects of the invention will in part be obvious and will in part appear hereinafter.

The invention accordingly comprises the method and apparatus embodying steps, features of construction, combinations of elements, and arrangements of parts adapted to effect such steps, as exemplified in the following detailed disclosure, the scope of the invention is indicated in the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

Figure 1:
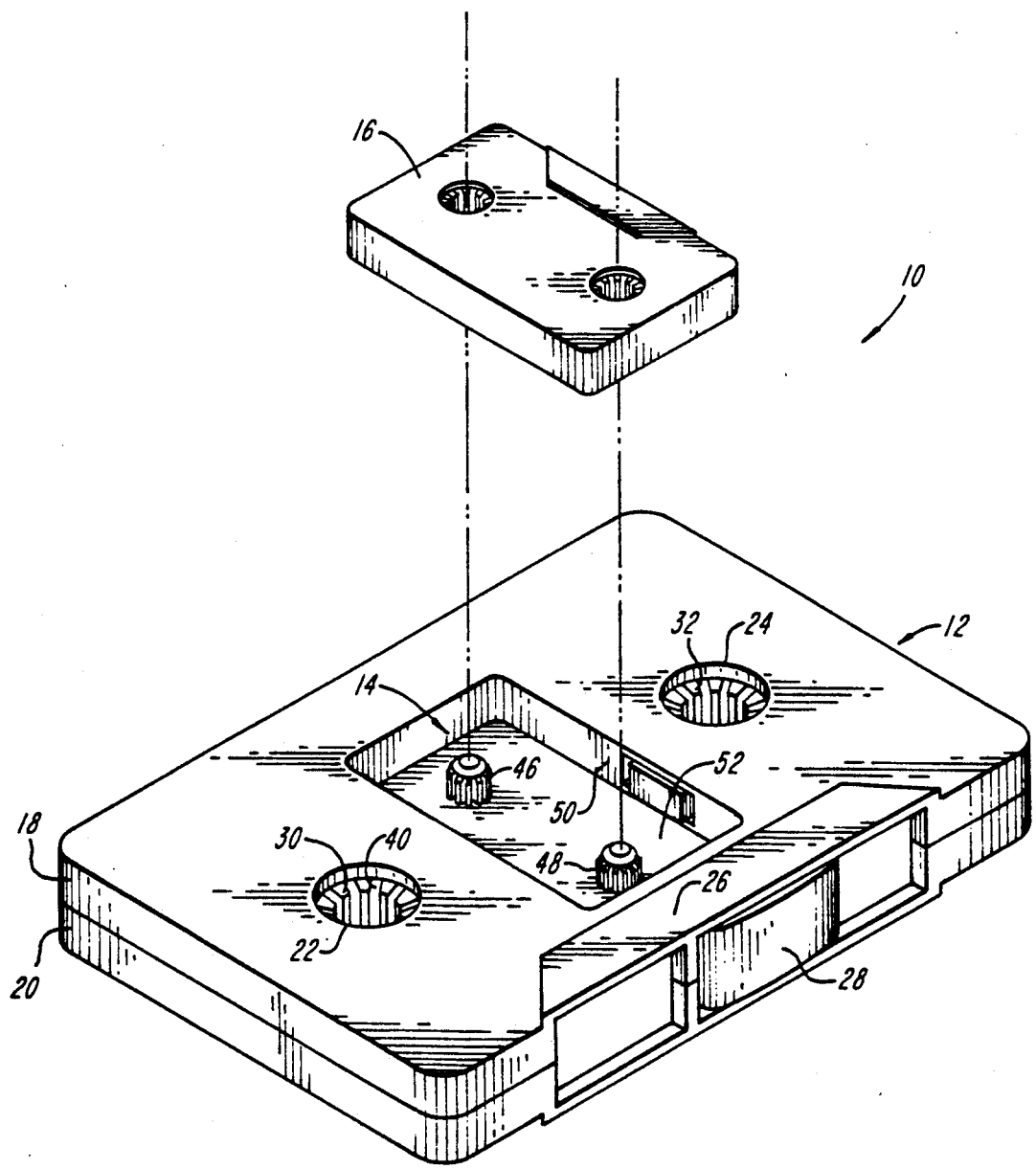
FIG. 1 is a perspective view of an adapter apparatus made in accordance with the teachings of the present invention.

Referring to the drawings wherein like reference numerals refer to like parts, there is illustrated an adapter apparatus 10 embodying the present invention. The adapter apparatus 10 includes a body 12 containing a compartment 14. A smaller cassette 16 can be removably and replaceably positioned within the compartment 14.

The body 12 is sized and configured as a standard cassette familiar to those skilled-in-the-art. The body 12 can be formed from complementary upper and lower body portions, reference numerals 18 and 20 respectively. The overall dimensions of the body 12 are such that it can be flush-mounted in the cassette-receiving receptacle of a suitable tape recorder/playback apparatus. In particular, the body 12 is normally between three and four inches long, between two and three inches wide, and between one-quarter and three-eighths inches thick. The upper body portion 18 and lower body portion 20 each include a pair apertures 22 and 24. When the upper and lower body portions 18 and 20 are assembled as shown in the several Figures, the apertures 22 and 24 are concentric and positioned so as to receive the tape drive elements of the tape recorder/playback apparatus. Positioned between the apertures 22 and 24 is the compartment 14. The body 12 also includes an enlarged portion 26. The enlarged portion 26 is positioned so as to receive the magnetic head assembly of the tape recorder/playback apparatus during operation of the invention. As shown better in FIG. 2, the enlarged portion 26 also houses a transfer magnetic head 28 which functions to feed the audio reproduction signal from the magnetic head 27 of the adapter apparatus into the reproduction head of the tape recorder/playback apparatus.

In the embodiment of the invention depicted in the Figures, each of the apertures 22 and 24 contain elements 30 and 32 for engaging the tape driving elements of the recorder/playback apparatus. The elements 30 and 32 have a substantially cylindrical configuration. More particularly, the elements 30 and 32 include a flared upper portion 34, a central cylindrical portion 36 and flared lower portion 38. The outer surfaces of portions 34 and 38 have a shape complementary to the adjacent areas of the apertures 22 and 24, that is, they have an outwardly directed flare. Flaring of these sections, serves to maintain the elements 30 and 32 concentric within the apertures 22 and 24 and helps keep the upper body portion 18 and lower body portion 20 of the body 12 aligned and together. The outer diameter of the lower portions 38 are also sized such that elements 30 and 32 can cooperate with the capstan elements 46 and 48 to transmit the proper tape speed for reproducing a signal on a tape contained within the smaller cassette 16 positioned in the compartment 14.

As shown in the Figure, a multiplicity of projections 42 can extend from the inner surface 40 of central portion 36 of the elements 30 and 32. The projections 42, which can number up to fifteen, are positioned and sized such that they will engage the tape driving means of the recorder/playback apparatus, for example, a pair of capstans positioned in the cassette-receiving receptacle. In an alternative embodiment of the invention, however, the inner diameter of the central portion 36 of the elements 30 and 32 is modified, i.e., decreased, while the outer diameter is maintained at the desired size. Decreasing the inner diameter of the elements 30 and 32 permits a snug engagement of these components and the capstans of the tape recorder/playback apparatus. Both the projections 42, or the inner diameter of the central portion 36, must be sized such that a central portion of the apertures 22 and 24, i.e., where the capstans of the tape recorder/playback apparatus will be positioned during operation of the invention, is open.

An endless drive belt 44 partially encircles the central portion 36 of the elements 30 and 32. The belt 44 functions to transmit the driving force produced as a result of the rotation of the elements 30 and 32 to the capstan elements 46 and 48, described in detail below, positioned in the compartment 14.

Figure 3:
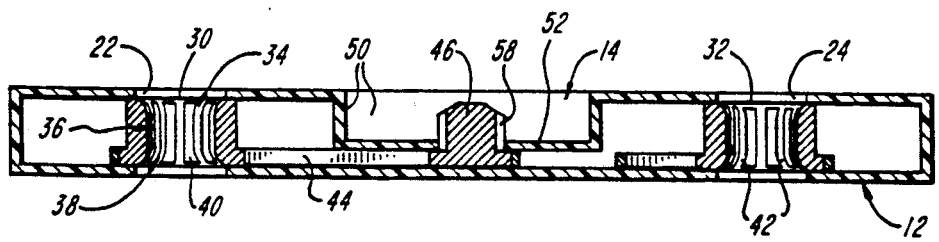
FIG. 3 is a side view along line 3—3 of the adapter apparatus as shown in FIG. 2.

The compartment 14 can be substantially rectangular and is preferably positioned between the apertures 22 and 24. The compartment 14 is positioned such that its major axis is substantially perpendicular to the major axis of the body 12. The upper portion 18 of the body 12 typically includes the sides 50 and base 52 of the compartment 14. The compartment 14 is sized such that it will not only receive the smaller cassette 16 but also so that the upper surface of the smaller cassette 16 will be flush within the upper surface of the body 12. More particularly, the compartment 14 is normally between two and two and one-half inches long, between one and one and one-half inches wide, and up to one-quarter of an inch deep depending on the size of the body 12. Extending up through the base 52 of the compartment 14 are a pair of capstan elements 46 and 48. The capstan elements 46 and 48 are connected to elements 30 and 32 for engaging the tape driving element of the recorder/playback apparatus via the drive belt 44. More particularly, as shown in FIG. 3, the drive belt 44 partially encircles a lower portion of the capstan elements 46 and 48 which is below the base 52 of the compartment 14.

Each of the capstan elements 46 and 48 preferably have three evenly spaced projections 58 extending from its outer surface. The projections 58 serve to engage the take-up reels of the smaller cassette 16 when it is positioned in the compartment 14. The capstan elements 46 and 48 are, of course, positioned to permit positioning of the smaller cassette 16 in the compartment 14. Further, capstan elements 46 and 48 and the projections 58 are sized to insure efficient engagement and disengagement of the take-up reels of the smaller cassette 16.

Figure 2:
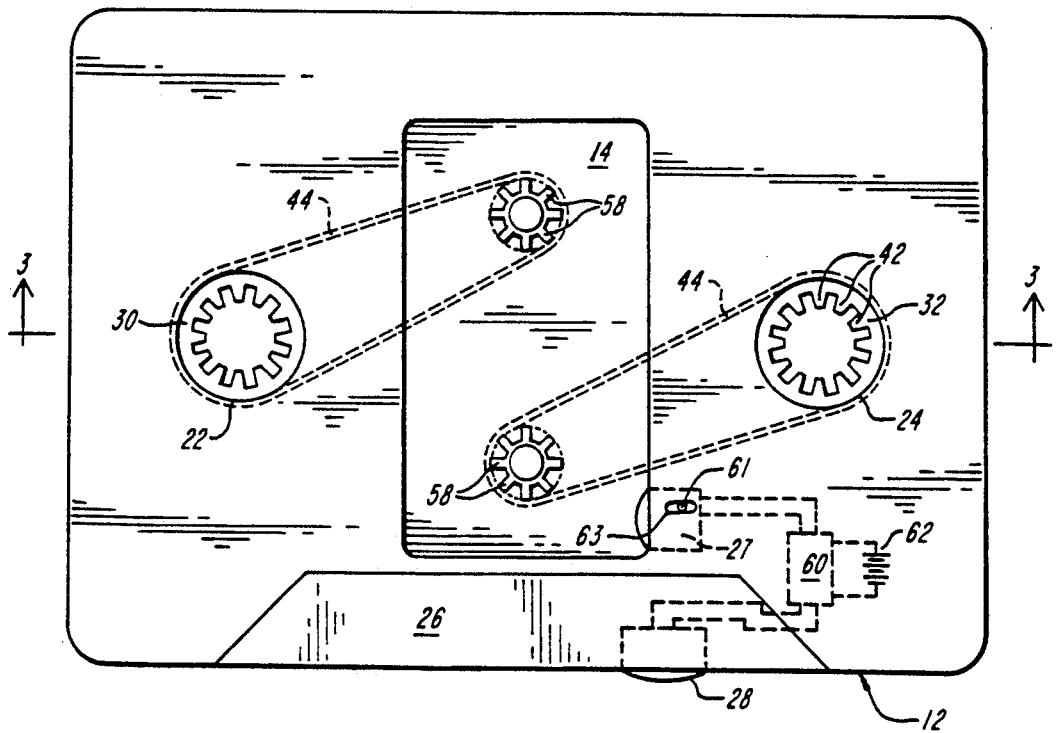
FIG. 2 is a top view of the adapter apparatus of FIG. 1.

As shown partially in phantom in FIG. 2, the compartment 14 also houses the magnetic head 27 of the adapter apparatus 10. The magnetic head 27 can be moveable between an extended position and a recessed position relative to the compartment 14. As shown in the Figure, the magnetic head 27 can be slided into position by exerting a lateral force on a guide element 61 which is connected to the magnetic head 27. A slot 63 limits and directs the movement of the guide element 61 to insure proper placement of the magnetic head 27 relative to the compartment 14. Alternatively, a pivot mechanism (not shown) can be used to move the magnetic head 27 concurrent with positioning of the smaller cassette 16 in the compartment 14. When in the extended position a significant portion of the magnetic head 27 extends into the compartment 14. Only a small portion of the magnetic head 27 extends into the compartment 14 when the head 27 is in its recessed position. The output from the magnetic head 27 is delivered to an amplifier 60 which is supplied from a battery 62 or other power source familiar to those skilled-in-the-art. The output of the amplifier 60 is delivered to the transfer magnetic head 28 which is in contact with the reproducing head of the tape recorder/playback apparatus. Both the transfer magnetic head 28 and magnetic head 27 can be positioned as desired within the apparatus 10. Those skilled-in-the-art will appreciate that the only limitation on positioning these components is their size and shape relative to the size and shape of the body 12. Modification of the position of these components permits the apparatus 10 to be used with any configuration of microcassette or tape recorder/playback apparatus reproduction head assembly.

In operation, the user first inserts the smaller cassette 16, e.g., a microcassette familiar to those skilled-in-the-art, into the compartment 14 and moves the magnetic head 27 into contact with the tape contained within the smaller cassette 16. The user then positions the apparatus 10 in the tape recorder/playback apparatus by either pressing or sliding it into the cassette-receiving receptacle as appropriate. Next, the user turns the tape recorder/playback apparatus on, making sure that the reproducing head of the tape recorder/playback apparatus is in contact with the transfer magnetic head 28 of the adapter apparatus 10.

Once the tape recorder/playback apparatus is turned on, its tape driving elements will begin to rotate, engaging the projections 42 of the elements 30 and 32. As the tape driving elements of the tape recorder/playback apparatus continue to rotate, the elements 30 and 32 will also rotate thus producing movement of the drive belt 44, and, accordingly, the capstan elements 46 and 48. As the capstan elements 46 and 48 rotate they will cause rotation of the take-up reels of the smaller cassette 16 and, accordingly, movement of the tape therein across the magnetic head 27. As the tape passes over the surface of the magnetic head 27 the signal on the tape is read and passed on to the amplifier 60 and, in turn, the transfer magnetic head 28 in the manner described above.

It will thus be seen that the invention efficiently attains the objects set forth above, among those made apparent from the preceding description. In particular, the invention provides an apparatus and method for using a smaller cassette, e.g., microcassette, in a recorder/playback apparatus designed to accept cassettes having a larger overall configuration.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. An adapter apparatus for use with a tape recording and playback apparatus, said tape recording and playback apparatus having a tape drive means and a magnetic head, said adapter apparatus being sized to be flush-mounted and contained within a cassette-receiving receptacle of said tape recording and playback apparatus and comprising:
   a.) a first and second means for operatively engaging with said tape drive means of said tape recording and playback apparatus;
   b.) a compartment sized to receive a tape cassette which is substantially smaller in external configuration than a cassette which is operatively receivable within said cassette-receiving receptacle of said tape recording and playback apparatus, said compartment being positioned between said first and second means for operatively engaging with said tape drive means of said tape recording and playback apparatus, a major axis of said compartment being perpendicular to major axis of said adapter apparatus;
   c.) first and second capstan means positioned in said compartment, said capstan means being operatively connected to said first and second means for operatively engaging said tape drive means of said tape recording and playback apparatus;
   d.) a magnetic head, a portion of said magnetic head extending into said compartment of said adapter apparatus; and,
   e.) means for connecting said magnetic head of said adapter apparatus to said magnetic head of said tape recording and playback apparatus.

2. The adapter apparatus of claim 1 further including first and second substantially circular apertures, said apertures being positioned to receive said tape drive means of said tape recording and playback apparatus.

3. The adapter apparatus of claim 2 wherein said first means for operatively engaging with said tape drive means of said tape recording and playback apparatus is a rotatable hub, said hub being adjacently positioned relative to said first aperture in said adapter apparatus.

4. The adapter apparatus of claim 3 wherein said second means for operatively engaging with said tape drive means of said tape recording and playback apparatus is a rotatable hub, said hub being adjacently positioned relative to said second aperture in said adapter apparatus.

5. The adapter apparatus of claim 4 wherein each of said hubs have a multiplicity of projections, said projections extending from an outer surface of said hubs and into said first and second apertures in said adapter apparatus.

6. The adapter apparatus of claim 5 wherein a drive belt operatively connects said first means for operatively engaging with said tape drive means of said tape recording and playback apparatus to said first capstan.

7. The adapter apparatus of claim 6 wherein a drive belt operatively connects said second means for operatively engaging with said tape drive means of said tape recording and playback apparatus to said second capstan.

8. The adapter apparatus of claim 2 wherein said first means for operatively engaging with said tape drive means of said tape recording and playback apparatus is a cylindrical hub concentrically positioned within said first aperture, said hub being sized to snugly engage said tape drive means of said tape recording and playback apparatus.

9. The adapter apparatus of claim 8 wherein said second means for operatively engaging with said tape drive means of said tape recording and playback apparatus is a cylindrical hub concentrically positioned within said second aperture, said hub being sized to snugly engage said tape drive means of said tape recording and playback apparatus.

10. The adapter apparatus of claim 9 wherein a drive belt operatively connects said first means for operatively engaging, said tape drive means of said tape recording and playback apparatus to said first capstan.

11. The adapter apparatus of claim 10 wherein a drive belt operatively connects said second means for operatively engaging with said tape drive means of said tape recording and playback apparatus to said second capstan.

12. The adapter apparatus of claim 2 wherein said compartment of said adapter is positioned between said apertures in said adapter apparatus, a major axis of said compartment being perpendicular to major axis of said adapter apparatus.

13. The adapter apparatus of claim 1 wherein said magnetic head of said adapter apparatus is moveable between an extended position, wherein a major portion of said magnetic head extends into said compartment, and a recessed position, wherein a minor portion of said magnetic head extends into said compartment.

14. An adapter apparatus for use with a tape recording and playback apparatus, said tape recording and playback apparatus having ga tape drive means and a magnetic head, said adapter apparatus being configured as a standard compact cassette and being sized to be flush-mounted and contained within a cassette-receiving receptacle of said tape recording and playback apparatus and comprising:
 a.) first and second apparatus positioned to receive said tape drive means of said tape recording and playback apparatus;
 b.) first and second means for operatively engaging with said tape drive means of said tape recording and playback apparatus;
 c.) a compartment sized to receive a tape cassette which is substantially smaller in external configuration than the standard cassette which is operatively receivable within said cassette-receiving receptacle of said tape recording and playback apparatus and positioned between said first and second apertures, said compartment of said adapter being positioned between said first and second apertures positioned to receive said tape drive means of said tape recording and playback apparatus, a major axis of said compartment being perpendicular to major axis of said adapter apparatus;
 d.) first and second capstan means positioned in said compartment, said capstan means being operatively connected to said first and second means for operatively engaging with said tape drive means of said tape recording and playback apparatus;
 e.) a magnetic head; and,
 f.) a means for connecting said magnetic head of said adapter apparatus to said magnetic head of said tape recording and playback apparatus.

15. The adapter apparatus of claim 14 wherein said first means for operatively engaging with said tape drive means of said tape recording and playback apparatus is a cylindrical hub concentrically positioned within said first aperture, said hub being sized to snugly engage said tape drive means of said tape recording and playback apparatus.

16. The adapter apparatus of claim 15 wherein said second means for operatively engaging with tape drive means of said tape recording and playback apparatus is a cylindrical hub concentrically positioned within said second aperture, said hub being sized to snugly engage said tape drive means of said tape recording and playback apparatus.

17. The adapter apparatus of claim 16 wherein a drive belt operatively connects said first means for operatively engaging with said tape drive means of said tape recording and playback apparatus to said first capstan.

18. The adapter apparatus of claim 17 wherein a drive belt operatively connects said second means for operatively engaging with said tape drive means of said tape recording and playback apparatus to said second capstan.

* * * * *